United States Patent
Østergaard

(10) Patent No.: US 11,822,355 B2
(45) Date of Patent: Nov. 21, 2023

(54) PROGRAMMABLE ROBOT

(75) Inventor: Esben Hallundbæk Østergaard, Odense C. (DK)

(73) Assignee: UNIVERSAL ROBOT A/S, Odense S. (DK)

( * ) Notice: Subject to any disclaimer, the term of this patent is extended or adjusted under 35 U.S.C. 154(b) by 1116 days.

(21) Appl. No.: 13/885,233

(22) PCT Filed: Nov. 16, 2011

(86) PCT No.: PCT/EP2011/070228
§ 371 (c)(1),
(2), (4) Date: May 14, 2013

(87) PCT Pub. No.: WO2012/066025
PCT Pub. Date: May 24, 2012

(65) Prior Publication Data
US 2013/0231778 A1   Sep. 5, 2013

(30) Foreign Application Priority Data
Nov. 16, 2010   (EP) .................................. 10191338

(51) Int. Cl.
*G06F 17/00* (2019.01)
*G05D 3/00* (2006.01)
(Continued)

(52) U.S. Cl.
CPC .............. *G05D 3/00* (2013.01); *B25J 9/1656* (2013.01); *G05B 19/401* (2013.01);
(Continued)

(58) Field of Classification Search
CPC ................... G05D 3/00; G05B 19/401; G05B 2219/36322; G05B 2219/36401; B25J 9/1656; Y10S 901/27
(Continued)

(56) References Cited

U.S. PATENT DOCUMENTS

| 4,166,543 A | 9/1979 | Dahlstrom |
| 4,398,110 A | 8/1983 | Flinchbaugh et al. |

(Continued)

FOREIGN PATENT DOCUMENTS

| CN | 103250109 A | 8/2013 |
| DE | 2735632 C2 | 9/1983 |

(Continued)

OTHER PUBLICATIONS

International Search Report for PCT/EP2011/070228 dated Feb. 9, 2012.
(Continued)

*Primary Examiner* — Ronnie M Mancho
(74) *Attorney, Agent, or Firm* — Burns & Levinson LLP

(57) ABSTRACT

The present invention relates to a user friendly method for programming a robot, where the method comprises placing the robot at a given position P0 in the surroundings and using a portion or point P of the robot (for instance the point to which a tool is attached during use of the robot) to define one or more geometrical features relative to the surroundings of the robot and establishing a relationship between the geometrical features and first coordinates of a robot-related coordinate system, whereby the robot can subsequently be instructed to carry out movements of specified portions of the robot relative to said surroundings by reference to said one or more geometrical features. By these means it becomes easy for users that are not experts in robot programming to program and use the robot. The geometrical features can according to the invention be stored in storage means and used subsequently also in other settings than the specific setting in which the programming took place.

38 Claims, 1 Drawing Sheet

(51) Int. Cl.
    *G05B 19/401*     (2006.01)
    *B25J 9/16*     (2006.01)

(52) U.S. Cl.
    CPC .............. *G05B 2219/36322* (2013.01); *G05B 2219/36401* (2013.01); *Y10S 901/27* (2013.01)

(58) Field of Classification Search
    USPC ....... 700/245, 249, 145, 165, 264, 247, 261; 318/568.11, 568.13; 73/1.01; 345/418
    See application file for complete search history.

(56) References Cited

U.S. PATENT DOCUMENTS

| | | | |
|---|---|---|---|
| 4,678,952 A | | 7/1987 | Peterson et al. |
| 4,744,039 A | | 5/1988 | Suzuki et al. |
| 4,753,569 A | | 6/1988 | Pryor |
| 4,817,017 A | | 3/1989 | Kato |
| 5,103,941 A | | 4/1992 | Vranish |
| 5,155,423 A | | 10/1992 | Karlen et al. |
| 5,220,261 A | | 6/1993 | Kempas |
| 5,293,107 A | | 3/1994 | Akeel |
| 5,341,289 A | | 8/1994 | Lee |
| 5,353,386 A | * | 10/1994 | Kasagami ............. B25J 9/1682 700/247 |
| 5,495,410 A | | 2/1996 | Graf |
| 5,880,956 A | | 3/1999 | Graf |
| 6,040,109 A | | 3/2000 | Coppens et al. |
| 6,041,274 A | * | 3/2000 | Onishi et al. .................... 701/26 |
| 6,070,109 A | | 5/2000 | McGee et al. |
| 6,131,296 A | | 10/2000 | Faeger |
| 6,292,715 B1 | * | 9/2001 | Rongo ......................... 700/249 |
| 6,408,224 B1 | * | 6/2002 | Okamoto ............... B25J 9/1661 29/721 |
| 6,519,860 B1 | | 2/2003 | Bieg et al. |
| 6,535,794 B1 | | 3/2003 | Raab |
| 6,704,619 B1 | * | 3/2004 | Coleman ............. G05D 1/0255 318/567 |
| 6,822,412 B1 | | 11/2004 | Gan et al. |
| 6,837,892 B2 | | 1/2005 | Shoham |
| 6,847,922 B1 | * | 1/2005 | Wampler, II ....... G05B 19/4069 700/251 |
| 6,856,863 B1 | | 2/2005 | Sundar |
| 6,922,610 B2 | * | 7/2005 | Okamoto ................... B25J 9/06 219/121.74 |
| 6,996,456 B2 | | 2/2006 | Cordell et al. |
| 7,248,012 B2 | * | 7/2007 | Takahashi ............. G05B 19/425 318/568.13 |
| 7,272,524 B2 | | 9/2007 | Brogardh |
| 7,278,222 B2 | | 10/2007 | Maier et al. |
| 7,298,385 B2 | | 11/2007 | Kazi et al. |
| 7,300,240 B2 | | 11/2007 | Brogardh |
| 7,571,025 B2 | | 8/2009 | Bischoff |
| 7,643,907 B2 | * | 1/2010 | Fuhlbrigge ............. B25J 9/1656 700/264 |
| 7,756,608 B2 | | 7/2010 | Brogardh |
| 8,002,716 B2 | * | 8/2011 | Jacobsen ............... A61M 25/09 600/585 |
| 8,050,797 B2 | | 11/2011 | Lapham |
| 8,160,205 B2 | | 4/2012 | Saracen et al. |
| 8,255,462 B2 | * | 8/2012 | Kondo ........................ 709/205 |
| 8,301,421 B2 | * | 10/2012 | Bacon .................. B25J 9/1605 700/186 |
| 8,340,820 B2 | * | 12/2012 | Nair ...................... B25J 9/1666 700/255 |
| 8,410,732 B2 | | 4/2013 | Kassow et al. |
| 8,457,786 B2 | | 6/2013 | Andersson |
| 8,571,706 B2 | * | 10/2013 | Zhang ............. G05B 19/41885 700/245 |
| 8,571,711 B2 | * | 10/2013 | Jacobsen ................ B08B 9/045 180/9.21 |
| 8,614,559 B2 | | 12/2013 | Kassow et al. |
| 8,756,973 B2 | * | 6/2014 | Wallace et al. ................ 73/1.79 |
| 8,774,965 B2 | * | 7/2014 | Weiss ................... B25J 9/1664 700/245 |
| 8,779,715 B2 | * | 7/2014 | Kassow ............... B25J 19/0004 318/568.1 |
| 8,812,155 B2 | | 8/2014 | Brethe |
| 9,248,573 B2 | | 2/2016 | Soe-Knudsen et al. |
| 2002/0013675 A1 | * | 1/2002 | Knoll et al. ................... 702/150 |
| 2003/0120391 A1 | | 6/2003 | Saito |
| 2004/0078114 A1 | * | 4/2004 | Cordell et al. ................. 700/258 |
| 2004/0172164 A1 | * | 9/2004 | Habibi et al. ................. 700/245 |
| 2004/0189631 A1 | * | 9/2004 | Kazi et al. ..................... 345/418 |
| 2004/0212626 A1 | | 10/2004 | Lyxzen et al. |
| 2005/0080515 A1 | * | 4/2005 | Watanabe et al. ............. 700/264 |
| 2005/0267637 A1 | | 12/2005 | Lapham |
| 2005/0273198 A1 | | 12/2005 | Bischoff |
| 2006/0069466 A1 | * | 3/2006 | Kato ...................... B25J 9/1682 700/264 |
| 2006/0125806 A1 | | 6/2006 | Voyles et al. |
| 2006/0163939 A1 | | 7/2006 | Kuramochi et al. |
| 2006/0178775 A1 | | 8/2006 | Zhang et al. |
| 2008/0004632 A1 | | 1/2008 | Sutherland et al. |
| 2008/0140258 A1 | | 6/2008 | Ueno et al. |
| 2008/0188983 A1 | | 8/2008 | Ban et al. |
| 2008/0188986 A1 | | 8/2008 | Hoppe |
| 2008/0319557 A1 | | 12/2008 | Summers et al. |
| 2009/0076655 A1 | | 3/2009 | Blondel et al. |
| 2009/0157226 A1 | | 6/2009 | de Smet |
| 2009/0259337 A1 | | 10/2009 | Harrold et al. |
| 2009/0289591 A1 | | 11/2009 | Kassow et al. |
| 2010/0241270 A1 | * | 9/2010 | Eliuk et al. ................... 700/216 |
| 2011/0022216 A1 | | 1/2011 | Andersson |
| 2012/0210817 A1 | | 8/2012 | Kassow et al. |
| 2013/0079928 A1 | | 3/2013 | Soe-Knudsen et al. |
| 2013/0231778 A1 | | 9/2013 | Ostergaard |
| 2013/0255426 A1 | | 10/2013 | Kassow et al. |

FOREIGN PATENT DOCUMENTS

| | | |
|---|---|---|
| DE | 19858154 A1 | 6/2000 |
| DE | 10048096 A1 | 4/2002 |
| DE | 10157174 A1 | 6/2003 |
| DE | 10239694 A1 | 3/2004 |
| DE | 102006061752 A1 | 7/2008 |
| DE | 102008027008 A1 | 12/2009 |
| EP | 1505464 A2 | 2/2005 |
| EP | 1696289 A1 | 8/2006 |
| EP | 1724676 A1 | 11/2006 |
| EP | 2258521 A1 | 12/2010 |
| EP | 2453325 A1 | 5/2012 |
| EP | 2641136 A1 | 9/2013 |
| EP | 3015932 A1 | 5/2016 |
| ES | 2548037 T3 | 10/2015 |
| JP | H01-146645 A | 6/1989 |
| JP | H02-250782 A | 10/1990 |
| JP | H06-190753 A | 7/1994 |
| JP | H10-254527 A | 9/1998 |
| JP | 2001-050741 A | 2/2001 |
| JP | 2002-120174 A | 4/2002 |
| JP | 2004-49731 A | 2/2004 |
| JP | 2004-148466 A | 5/2004 |
| JP | 2004316722 A | 11/2004 |
| JP | 2005-148789 A | 6/2005 |
| JP | 2005-342885 A | 12/2005 |
| MX | 2013005425 A | 8/2013 |
| RU | 2013125348 A | 12/2014 |
| WO | WO-97/00454 A1 | 1/1997 |
| WO | WO-2004/071717 A1 | 8/2004 |
| WO | WO-2007/099511 A2 | 9/2007 |
| WO | WO-2009/107358 A1 | 9/2009 |
| WO | WO-2012/066025 A1 | 5/2012 |

OTHER PUBLICATIONS

Written Opinion of the International Searching Authority for PCT/EP2011/070228 dated Feb. 9, 2012.
Written Opinion of the International Preliminary Examining Authority for PCT/EP2011/070228 dated Oct. 17, 2012.
International Preliminary Report on Patentability for PCT/EP2011/070228 dated Feb. 27, 2013.

(56) References Cited

OTHER PUBLICATIONS

Maier, C., Aufbau und Einsatz von Industrierobotern, Design and Use of Industrial Robots, Lecture Notes, 3rd Edition, Institute for Production Technology, 11 pages (1996). [English translation unavailable].
Opposition against EP 2641136 B1, 27 pages (Jul. 22, 2015).
User Manual KR C2 / KR C3 Expert Programming, KUKA System Software (KSS) Release 5.2, Version 00: 183 pages (2003).
Summons in counterpart European case to attend oral proceedings pursuant to Rule 115(1) EPC for EP11784999.2-1802 / 2641136, 8 pages (Dec. 1, 2016).
Communication pursuant to Article 94(3) EPC for EP15176362.0-1802, 4 pages (dated Jan. 5, 2017).
Bennett, D. and Hollerbach, J., Autonomous Calibration of Single-Loop Closed Kinematic Chains Formed by Manipulators with Passive Endpoint Constraints, IEEE Transactions of Robotics and Automation, 7(5):597-606 (1991).
Espacenet Patent Search; Family List EP2641136 downloaded Jun. 5, 2017 (2 pages).
File History for CN201180054670 downloaded Jun. 5, 2017 (70 pages).
File History for EP2453325 downloaded Jun. 5, 2017 (48 pages).
File History for EP2641136 downloaded Jun. 5, 2017 (1116 pages) (counterpart to U.S. Appl. No. 13/885,233).
File History for EP3015932 downloaded Jun. 5, 2017 (93 pages ).
flange.pdf (Merriam-Webster, Flange | Definition of flange by Merriam-Webster, Jun. 23, 2015, http://www.merriamwebster.com/dictionary/flange,pp. 1-4).
Robot.pdf (Dictionary.com, Robot | Define Robot at Dictionary.com, Jun. 23, 2015, http://dictionary.reference.com/browse/robot?s=t, pp. 1-5).
First Examination Report for 1608/KOLNP/2013, 6 pages (dated Mar. 26, 2019).
Communication pursuant to Article 94(3) in EP Application No. 15176362.0 dated Oct. 18, 2018 (7 pages).
Communication pursuant to Article 94(3) in EP Application No. 15176362.0 dated Feb. 26, 2019 (7 pages).
File History for EP Application No. 11784999.2 [Jul. 2, 2017 through Apr. 2, 2018] (97 pages).

\* cited by examiner

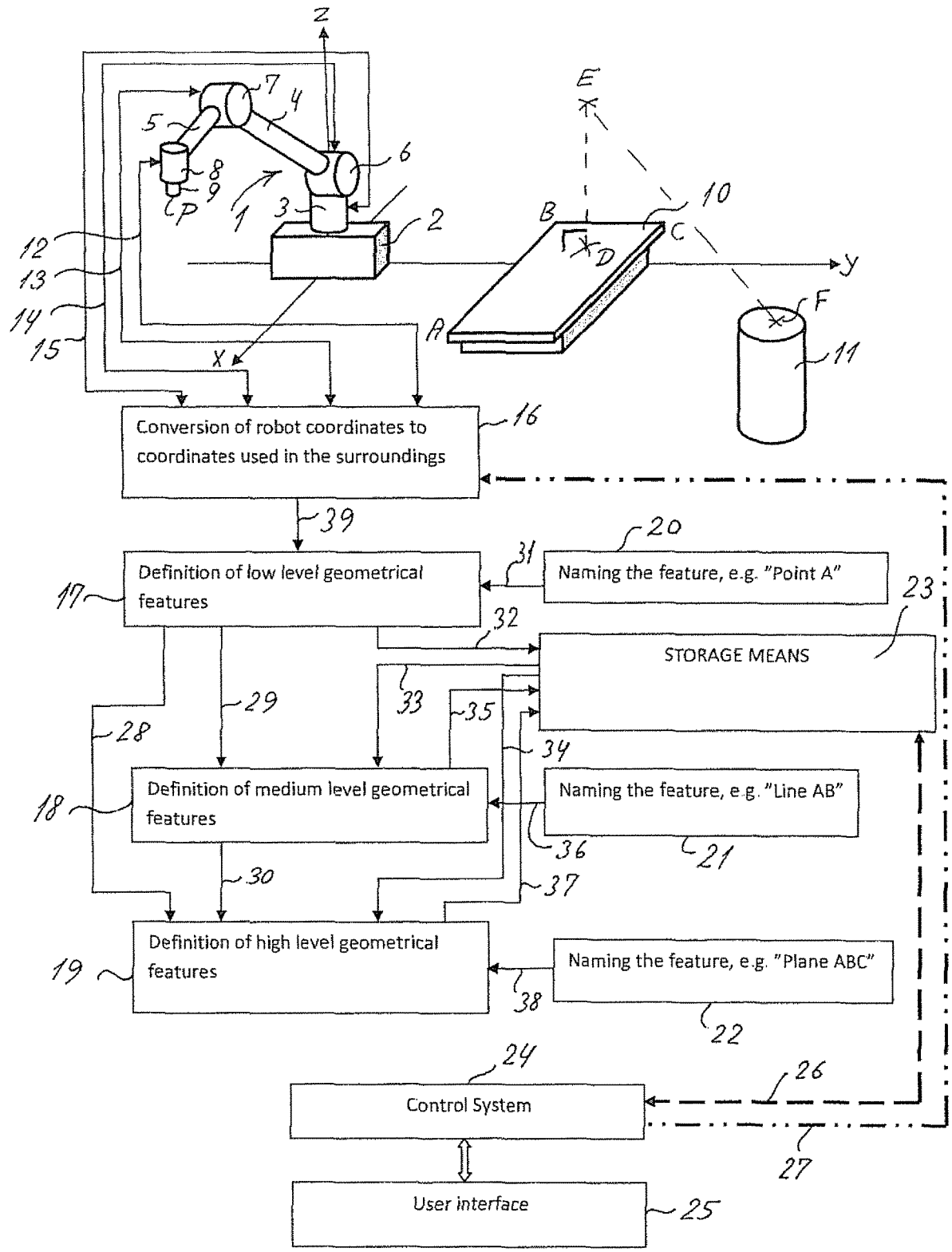

PROGRAMMABLE ROBOT

TECHNICAL FIELD

The present invention relates generally to the field of programmable robots and more specifically to programming methods for such robots.

BACKGROUND OF THE INVENTION

Customers who buy industrial robots generally want to be able to control or manipulate a robot, and to program the robot, relative to various objects and boundaries in the surroundings of the robot, such as machines, objects or blanks, fixtures, conveyers, pallets or vision systems. Traditionally this is done by defining "frames" (coordinate systems) that relate the internal coordinate system of the robot (the base coordinate system) to the relevant object's coordinate system. Reference can be made both to "tool coordinates" and to "base coordinates" of the robot.

A problem with such frames is that a certain level of mathematical knowledge is required in order to be able to define such coordinate systems and also that it takes a considerable time to carry out this task, even for a person skilled in the art of robot programming and installation. Often this task involves the calculation of 4×4 matrices. Particularly the representation of orientation is complicated for a person who lacks the required experience to understand this problem.

Questions often asked by customers are for instance:
(i) "Will it be possible to move the robot 4 cm away from the claw of my computerised numerically controlled (CNC) machine?"
(ii) "Is it possible to rotate the tool of the robot 45 degrees relative to the table?"
(iii) "Can we make the robot move vertically downwards with the object, let the object loose, and then move the robot vertically upward again?"

The meaning of such and similar questions is very straight forward to an average costumer who intends to use a robot, for instance at various stations in a production plant, and it may seem annoying and incomprehensible to the customer to be told that there may not be a simple answer to such—relevant—questions. The reasons why it is difficult to give a simple answer to such questions are inter alia:
(i) It is not clearly defined how the coordinate system of the CNC machine is positioned and oriented relative to the robot.
(ii) It is not well-defined what is meant by a given rotation, for instance "45 degrees". Rotation can be defined relative to a rotational axis and this axis can be oriented in infinitely many directions in space. Also the starting point of the rotation (corresponding for instance to 0 degrees) can be anywhere over a 360 degrees interval.
(iii) The meaning of the term "vertical" is not well-defined, as it depends on the positioning of the robot. It could for instance mean "perpendicular to the table upon which an object to be manipulated by the robot is placed".

In U.S. Pat. No. 4,744,039 is described a robot control system having a robot hand movable along a plane according to position data determined in terms of an absolute coordinate system related to the plane for acting on a workpiece which is arbitrarily positioned on the plane and which is provided with a linear reference pattern. The robot hand is swept along a predetermined locus on the plane according to programmed position data to determine the position of the workpiece. A detector mounted on the hand moves relative to the plane together with the hand for detecting the linear reference pattern whenever the hand crosses the linear reference pattern during the sweep movement of the hand to produce a corresponding detection signal. A read circuit operates in response to the detection signal for reading position data representative of a plurality of crossing points between the locus and the linear reference pattern in terms of the absolute coordinate system, and a processor processes the read position data to determine a position of the workpiece relative to the plane.

The above few examples show that there is a need for a method by means of which a user can instruct the robot how to move, without the user having knowledge about coordinate systems, rotational matrices, transformation matrices etc, and by application of the user's own terms that seem clear and well-defined to the operator.

SUMMARY OF THE INVENTION

The above and other objects and advantages are obtained by the provision of a programmable robot having the unique feature that it can be programmed by manually moving a defined portion or point P on the robot, for instance on the robot arm (such as the portion of the arm at which a tool is to be attached), around to the different positions in the surroundings of the robot that are relevant for the particular task at hand. This feature is very essential for the robot being programmable by non-expert users to perform even very complicated tasks. According to the present invention, this feature is utilized to enable a user to define "geometrical features" or "geometrical information" relating to the immediate surroundings of the robot. Defining such geometrical features can for instance take place by:
(a) Moving point P on the robot arm to a first point A in the surroundings and register the location in space of this point, then move point P to a second point B in the surroundings and register its location in space. These two points A and B, i.e. their respective locations in space, now define an axis AB and it is possible subsequently to instruct the robot to move point P (for instance a pickup tool) along this axis either in the direction from A towards B or from B towards A.
(b) Defining an axis as above, for instance on a table, and subsequently instructing the robot to rotate P about this axis.
(c) Move point P to three points for instance on a table and thus define a plane containing these three points. Subsequently instructing the robot to move point P along a line perpendicular to this plane, and hence to the surface of the table.

The geometrical features defined as exemplified above can be stored in storage means in the robot or connected with the robot for subsequent use. According to the invention, it is furthermore possible to combine the geometrical features to define more complex geometrical features, which again might be used for creating even more complex geometrical features. Thus, according to the invention, the robot itself can be used to define a hierarchy of geometrical features, the first level of which comprises simple basic features, such as lines and planes, and where a second and higher level of features for instance comprises various 3D objects in space. Also it is possible, and indeed often necessary, to specify an orientation of such features, for instance a positive direction on a line, a positive rotation about an axis, a positive normal vector to a plane, etc.

Thus, according to a first aspect of the present invention there is provided a method for programming a robot, the method comprising the steps of (i) using a portion or point P of the robot to define one or more geometrical features relative to the surroundings of the robot, (ii) designating such features by a specific name or label and storing these features in storage means for subsequent retrieval, and (iii) establishing a relationship between said geometrical feature and a robot-related coordinate system, whereby the robot can subsequently be instructed to carry out movements of specified portions of the robot relative to said surroundings by reference to said one or more geometrical features.

According to an advantageous embodiment of the method according to the invention, the above mentioned geometrical features that are defined by movement of the robot as described can be regarded (and labelled and stored) as "simple" or "low level" features.

According to the first aspect of the present invention there is provided a method for controlling a programmable robot, wherein the method comprises the steps of: (i) placing the robot at a predefined position $P_0$ at the operational site, which predefined position has previously been used for defining geometrical features that characterise the movement of a point P on the robot and/or operationally relevant objects in the surroundings, and (ii) instructing the robot with respect to its movements in the surroundings by reference to said geometrical features.

According to an embodiment of the invention, said geometrical features are during instruction of the robot retrieved from storage means in or associated with the robot. According to a second aspect, the present invention relates to the use of a robot for defining objects in its surroundings and one or more paths of movement of at least one specific point on the robot and characterising these objects and paths by geometrical features that are stored and subsequently used during programming of the robot to specify the movement of the robot and relevant objects in the surroundings.

According to a third aspect of the present invention there is provided a programmable robot comprising means for defining geometrical features and optionally for combining such features to define more complex geometrical features, and for translating such features to information that can be used by the robot control system to control the movement of the robot.

It is advantageous in the method/robot according to the invention to apply the same sensors that are used for controlling the motors/robot joints for defining the geometrical features. Alternatively, one or more dedicated sensors might be used for defining the geometrical features.

In summary, the present invention relates according to a first aspect to a method for programming a robot, the method comprising placing the robot at a given position Po in the surroundings of the robot and using a portion or point P on the robot to define one or more geometrical features relative to objects in the surroundings of the robot and establishing a relationship between said geometrical features and first coordinates of a robot-related coordinate system, whereby the robot can subsequently be instructed to carry out movements of specific portions of the robot relative to said surroundings by reference t said one or more geometrical features.

According to an embodiment of the invention the robot comprises an articulated robot arm and where said portion of point P is located on the articulated robot arm. According to another embodiment of the invention the robot comprises one or more sections that can undergo translatory displacement.

According to an embodiment of the invention said first coordinates are converted to second coordinates of a coordinate system characterising the surroundings, in which the robot is placed.

According to an embodiment of the invention, the method comprises the steps of:
(i) defining a plurality of points in the surroundings of the robot by means of the articulated robot arm, whereby the robot automatically assigns coordinates to each of said plurality of points;
(ii) for each of said points and the corresponding assigned coordinates, providing a name or label characterizing the point and storing each points, i.e. the corresponding coordinates and name or label as a low level geometrical feature in a record in storage means, such that said low level geometrical features can subsequently be retrieved from the storage means.

According to an embodiment of the invention, in a first step (i) of the method, said two or more of said stored low level geometrical features are retrieved from said storage means, and wherein at least two of said low level geometrical features are combined to form higher level geometrical features, such features being characterised by the respective coordinates of the corresponding low level features; after which first step each of the thus defined higher level geometrical features are in a second step (ii) provided with a name or label characterising the feature, after which follows the step (iii) of storing each of the respective higher level geometrical features, i.e. the corresponding set of coordinates and the corresponding name or label in a record in storage means, such that the higher level geometrical features can subsequently be retrieved from the storage means.

According to an embodiment of the method of the invention, the stored geometrical features can be retrieved from the storage means and used to provide a representation of the robot and its surroundings, for instance comprising a graphical display on a user interface of the path of motion of point P on the robot through the surroundings and of objects in the surroundings.

According to an embodiment of the method of the invention, the stored geometrical features can be retrieved from the storage means and by conversion of the coordinates that represent the different retrieved geometrical features, whereby for instance the path of motion of point P on the robot and the geometrical characteristics, such as size, shape, orientation, of objects represented by stored geometrical features can be modified.

According to a second aspect the present invention relates to a method of controlling a robot, the method comprising the steps of:
(i) placing the robot at a predefined position $P_0$ at an operational site, which predefined position has previously been used for defining geometrical features that characterise the movement of a point P on the robot and/or operationally relevant objects in the surroundings, and
(ii) instructing the robot with respect to its movements in the surroundings by reference to said geometrical features.

According to an embodiment of the control method said geometrical features are during instruction of the robot retrieved from storage means in or associated with the robot.

According to a third aspect, the present invention relates to a programmable robot provided with means for carrying out the method according to the method of the invention as described above, the robot comprising sensor means for defining geometrical features for use during programming of the robot and for subsequently controlling the robot during operation of the robot.

According to a preferred embodiment of the robot according to the invention, said sensor means comprises the sensors that are used for controlling the motors/joints of the robot.

According to a specific embodiment of the invention the programmable robot comprises a base section, a plurality of arm sections, two adjacent arm sections being connected via a joint and sensor means provided in each respective joint to sense the rotation of the respective joint, the robot being furthermore provided with or being in data communication with means for defining and naming geometrical features based on signals from said sensor means, and where the robot is furthermore provided with or being in data communication with storage means for storing respective geometrical features, for instance in data records comprising one or more sets of coordinates characterising the respective geometrical features and an associated name or label designating the respective geometrical feature.

The robot is furthermore provided with a control system that, based on geometrical features retrieved from said storage means can control the movement of the robot by providing control signals to drive means in said joints of the robot.

According to an embodiment of the invention, the robot furthermore comprises, or is in data communication with, a user interface provided with a display on which at least said geometrical features can be displayed.

According to a fourth aspect, the present invention relates to the use of a robot for defining objects in its surroundings and one or more paths of movement of at least one specific point on the robot and characterising these objects and paths by geometrical features that are stored and subsequently used during programming of the robot to specify the movement of the robot and relevant objects in the surroundings.

BRIEF DESCRIPTION OF THE DRAWINGS

The invention will be better understood with reference to the following detailed description of an embodiment of the invention in conjunction with the FIGURES, wherein:

FIG. 1 shows a schematic representation of a programmable robot according to the invention together with the main functional blocks used during definition of the geometrical features, programming of the robot and control of the robot during actual use hereof.

DETAILED DESCRIPTION OF THE INVENTION

In the following there will be given a detailed description of a specific embodiment of the invention comprising a robot with encoders on each joint motor, wherein the robot can be taught a given position by manually moving a chosen part of the robot, such as the tool attachment member, or by jogging the robot to the different positions. The robot uses its joint encoders to measure the joint angles at the different positions, and the control software uses a kinematic model of the robot to translate these joint angles into a pose. The robot can then be programmed to move through these positions in sequence, where the robot is using the same encoders to reach the programmed poses, as was used to measure the poses.

With reference to FIG. 1 there is shown a schematic representation of a programmable robot according to an embodiment of the invention together with the main functional blocks used during definition of the geometrical features, programming of the robot and control of the robot during actual use hereof.

FIG. 1 illustrates the robot 1 placed at the origin of a xyz-coordinate system used for defining the surroundings and the movement of a point P on the robot (for instance the point on the robot at which a tool is located) relative to the surroundings. The exemplary robot shown comprises a base section 2, arm sections 3, 4, 5 and joints 6, 7, 8 connecting adjacent arm sections. A tool (not shown) can be attached to the end section 9 of the robot. In the surroundings of the robot, a table 10 and a container 11 are shown as an example.

The functional blocks and the communication lines indicated between pairs of functional blocks and between a functional block and elements on the robot 1 describe merely one embodiment of the invention, and the overall architecture of the programming and control system could in a practical implementation have another structure. Also, such functional features as the naming of geometrical features (reference numerals 20, 21 and 22) are shown as separate functional blocks, but they could also have been incorporated in the control system block 24 or in the user interface 25. In a practical implementation, the various software functions that correspond to the individual functional blocks shown in FIG. 1 will likely be integrated into one complete software function that also comprises the storage means indicated as block 23 in FIG. 1, although separate storage means could of course also be used.

The embodiment of the invention shown in FIG. 1 comprises the robot 1, the composition of which is described above. The respective joints 6, 7, 8 comprise separate drive motors and sensors used to indicate the rotation of the joint, i.e. the angle between one arm section and the adjacent arm section of the particular joint. These sensors (that are not shown in the FIGURE) may serve the dual purpose to control the robot and to provide information from the robot to the conversion means 16 that converts robot coordinates to coordinates used in the surroundings, for instance the xyz-coordinates by means of which a point, line or plane can be specified. The dual function of the sensors is indicated by the lines with double arrows 12, 13, 14, 15, connecting the robot with the coordinate conversion means 16.

A geometrical feature, Point A, can be defined by moving point P on the robot to Point A in the surroundings, which point in the present example corresponds to one corner of the table 10. When the robot is mounted at a particular location in the surroundings—in the shown example at the origin of the xyz-coordinate system—positioning point P on the robot at point A results in that the sensors in the robot attain certain values ($(\alpha, \beta, \gamma, \delta)$ in the robot coordinate system), which robot coordinates are translated to xyz-coordinates by the conversion means 16. The specific xyz-coordinates of Point A are via line 39 transferred to a functional block 17, wherein the low level geometrical feature "Point A" is defined and via the naming function 20 given an appropriate name or label. As indicated by line 32, this low level feature can be stored in storage means 23 as a record comprising the name and the coordinates. It should be noted that if the position and orientation of the robot relative to the surroundings are known a-priori, it would be possible simply to store the robot coordinates together with a feature name in the storage means and hence dispense with the coordinate conversion means 16.

The FIGURE illustrates further the subdivision of geometrical features into low level, medium level and high level features, but it should be understood that also alternative subdivisions might be used. Also it would be possible to refrain from, subdividing the geometrical features at all without thereby departing from the fundamental concepts of the invention. Each of the low, medium and high level features can be given names as illustrated by functional blocks 20, 21 and 22 and stored in appropriate records in the storage means 23.

The robot is furthermore provided with a control system 24 that controls the robot (as schematically indicated by the line 27) and that interacts with a user interface 25. Via line 26, the control system 24 can retrieve data from the storage means 23 and provide data hereto. Although not shown in FIG. 1, the control system may interact with other of the functional blocks and in a practical implementation some or all of these may in fact form an integrated part of the control system.

During actual use of the robot, different levels of geometrical features may be defined and used:
(a) Simple (low level) geometrical features, simply comprising points (A, D, C, . . . ) in space, designated by means of moving a point P on the robot to said point in space. These points are labelled appropriately (for instance: A, B, C . . . ) or by names (for instance "pick-up point", "intermediate station", "receptor point", . . . ) or possibly by their coordinates (($X_A$, $Y_A$, $Z_A$) or ($R_A$, $\Theta_A$, $\varphi_A$), . . . ). The labelled points can then be stored in storage means in or associated with the robot.
(b) More complex (medium level) geometrical features, either by means of the robot itself, or by means of previously stored geometrical features, defining more complex geometrical features, for instance defining a straight line in space by moving a point P on the robot from the one point A on the line to another point B on the line and thereafter giving the thus defined line AB an appropriate name and storing the defined line AB in storage means as described above. In this manner, a line of finite length AB can be defined, but it is also possible to define semi-infinite or infinite lines (A to ∞; ∞ to A or "−∞ to +∞") by regarding AB as a vector on said line. Other relatively simple geometrical shapes such as a plane (of finite or infinite extension) could also be defined in this manner.
(c) Still more complex (high level) geometrical features; if desired, the stored low level geometrical features can be retrieved from memory and used to define complex geometrical features (high level features), or a combination of such previously stored low and/or high level features and new measured features can be used to define said complex features and subsequently providing a defined high level feature with a name, and storing these features in storage means in or associated with the robot. For instance, a box (representing for example a container for certain produced components in a production line) can be defined by means of five previously defined and stored planes.

The basic software used in, or associated with, the robot according to the invention comprises at least:
Software which can associate names to the stored positions.
Software which can construct features from these named positions. Two positions define a line or a vector. Three positions can form a plane.
Software which, upon reception of proper instruction from a user can move the robot relative to these geometrical features.

As an example, consider a table 10. The robot (for instance point P on the robot) can be moved to one corner of the table, the position "A", the coordinates of which are registered by the robot and afterwards named by the user. Hereafter, P is moved to the next corner of the table, which position is called "B". It is now possible to construct a medium level geometrical feature, the vector AB, which can be called "short_side". The software of the robot according to the invention now provides more options for controlling the robot. The operator can now instruct the robot to move for instance 20 mm along the "short_side" of the table, or "jog" the robot relative to this vector, by selecting the "short_side" feature on the user interface, such as a jogging interface on a teach pendant.

Similarly, the point P on the robot can be positioned at a third corner of the table, which may be labelled "C" and a further medium level feature "long_side" can be defined, which is defined by the vector AC. Now the software of the robot according to the invention permits the operator to define a plane, which in this example can be considered as a high level geometrical feature, which plane is given by the points "ABC". The plane ABC can for instance be named "table_plane".

On the user interface (jogging) panel, there are now provided several options for moving the robot. The user can select "short_side", "long_side" or "table_plane". If "table_plane" is selected, it is now possible to move the robot for instance 2 mm towards the table, or it can be chosen to move the robot to the nearest position exactly 30 mm from the table plane, for instance as indicated by the points D and E in FIG. 1. The robot can also be instructed to move a tool an the robot from point E in a plane parallel with the plane of the table to a point F directly above the container 11, for instance during a pick and place operation.

This kind of programming has two unique features;
The programmer/operator does not need to know anything about 4×4 matrices or other types of pose transformations that are often required in order to carry out robot programming.
The encoders used to measure the positions can be, and are preferably, the same encoders used to move the robot. This eliminates the need for a calibration between the feature space and the robot's workspace.

The invention claimed is:
1. A method performed using a computing system to program a robot using a geometrical feature in a neighborhood of the robot, the method comprising:
manually positioning a part of the robot to obtain information representing the geometrical feature in the neighborhood, the geometrical feature comprising a line, a plane, or a three-dimensional object, wherein manually positioning comprises manually causing a part of the robot to move to points in the neighborhood in order to obtain data based on the points, the data being obtained from sensors associated with at least one of motors or joints of the robot, wherein the data is used to determine the information representing the geometrical feature; and
storing, in a storage device, the information representing the geometrical feature and a label identifying the geometrical feature;
wherein the information representing the geometrical feature and the label are usable by the robot to define movement of the part of the robot along the geometrical feature, and are usable by the robot to define movement of the part of the robot at points away from the geometrical feature, and are usable to implement the movement.
2. The method of claim 1, wherein the robot comprises an articulated robot arm, wherein the part of the robot is located on the articulated robot arm, and wherein the at least one of motors or joints of the robot are included within the articulated robot arm.

3. The method of claim 1, wherein the robot comprises one or more sections that can undergo translational displacement.

4. The method of claim 1, wherein the data is represented in robot-related coordinates; and
wherein the method further comprises translating robot-related coordinates to coordinates of a different coordinate system.

5. The method of claim 1, wherein the geometrical feature comprises one or more physical structures in the neighborhood.

6. The method of claim 1, wherein the method further comprises storing, in the storage device, information representing a composite comprised of two or more geometrical features, and a label for the composite.

7. The method of claim 1, further comprising retrieving at least some of the information from the storage device and using the retrieved information to provide a representation of the robot and the neighborhood, the representation comprising a graphical display on a user interface, the graphical display showing a path of motion of the part of the robot through the neighborhood.

8. The method of claim 7, wherein the path of motion is based on the geometrical feature.

9. A robot comprising:
a robot arm;
sensors to obtain data resulting from manual movement of the robot arm to points in a neighborhood of the robot in order to obtain the data from the sensors;
memory storing computer code; and
a control system to execute the computer code to control movements of the robot arm within the neighborhood of the robot and to obtain information based on the data from the sensors, the data corresponding to a geometrical feature in the neighborhood, the geometrical feature comprising a line, a plane, or a three-dimensional object;
the computer code also being executable by the control system to perform operations comprising: storing, in the memory, the information representing the geometrical feature and a label identifying the geometrical feature;
wherein the information representing the geometrical feature and the label are usable by the control system to control movement of a part of the robot along the geometrical feature, are usable by the robot to control movement of the part of the robot at points away from the geometrical feature, and are usable to implement the movement.

10. The robot of claim 9, wherein the robot arm comprises an articulated robot arm comprising at least one of motors or joints; and
wherein the data obtained from the sensors represents movement of the motors or joints.

11. The robot of claim 9, wherein the robot comprises one or more sections that can undergo translational displacement.

12. The robot of claim 9, wherein: the information represents at least one composite comprised of multiple geometrical features, the composite-having an associated label stored in the memory.

13. The robot of claim 9, further comprising a user interface to generate a graphical display based on at least some of the information, the graphical display comprising a representation of the robot and the neighborhood, the graphical display showing a path of motion of the at least part of the robot through the neighborhood.

14. The robot of claim 13, wherein the path is modifiable based on a translation of coordinates contained in the information.

15. The robot of claim 9, wherein the computer code is executable to generate computer instructions to instruct the movement.

16. A method performed using a computing system for programming a robot using a geometrical feature in a neighborhood of the robot, the robot comprising a robot arm, the method comprising:
manually positioning the robot arm in the neighborhood;
using positions of the robot arm to obtain information representing the geometrical feature, the geometrical feature comprising a line, a plane, or a three-dimensional object, wherein obtaining the information comprises:
obtaining data from sensors that are associated with least one of motors or joints of the robot arm, the data being based on points in the neighborhood, and
using the data to obtain the information representing the geometrical feature; and
storing, in computer memory, a label for the geometrical feature and the information representing the geometrical feature;
wherein the information representing the geometrical feature together with the label are usable to enable movement of a part of the robot along the geometrical feature, and are usable to enable movement of a part of the robot at points away from the geometrical feature.

17. The method of claim 16, wherein the robot arm comprises an articulated robot arm.

18. The method of claim 16, wherein the robot comprises one or more sections that are configured to undergo translatory displacement.

19. The method of claim 16, further comprising:
retrieving information representing one or more geometrical features from the computer memory; and
using the information retrieved to provide a representation of the robot and the neighborhood on a graphical display, the representation comprising a path of motion of the part of the robot through the neighborhood and relative to geometrical features in the neighborhood.

20. The method of claim 16, further comprising:
retrieving information representing one or more geometrical features from the computer memory; and
modifying a path of motion of the part of the robot relative to the one or more geometrical features based on the information retrieved.

21. The method of claim 1, wherein multiple movements of the part of the robot are definable for the geometrical feature at different points away from the geometrical feature.

22. The robot of claim 9, wherein multiple movements of the part of the robot are definable for the geometrical feature at different points away from the geometrical feature.

23. The robot of claim 16, wherein multiple movements of the part of the robot are enabled for the geometrical feature at different points away from the geometrical feature.

24. A method performed using a computing system to program a robot using a geometrical feature in a neighborhood of the robot, the method comprising:
manually positioning the robot to points in the neighbored to obtain information representing the geometrical feature in the neighborhood, the geometrical feature comprising a line, a plane, or a three-dimensional object, wherein obtaining the information comprises:
manually moving a part of the robot to the points in the neighborhood in order to obtain data based on the points, the data being obtained from sensors associated with at least one of motors or joints of the robot, and using the data to determine the information representing the geometrical feature; and storing, in a storage device, the information representing the geometrical feature and a label identifying the geometrical feature;

wherein the information representing the geometrical feature and the label are usable by the robot to define movements of the part of the robot along multiple different paths, and are usable to implement the movements.

25. The method of claim 24, wherein the robot comprises an articulated robot arm, wherein the part of the robot is located on the articulated robot arm, and wherein the at least one of motors or joints of the robot are included within the articulated robot arm.

26. The method of claim 24, wherein the robot comprises one or more sections that can undergo translational displacement.

27. The method of claim 24, wherein the data is represented in robot-related coordinates; and wherein the method further comprises translating robot-related coordinates to coordinates of a different coordinate system.

28. The method of claim 24, wherein the geometrical feature comprises one or more physical structures in the neighborhood.

29. The method of claim 24, wherein the method further comprises storing, in the storage device, information representing a composite comprised of two or more geometrical features, and a label for the composite.

30. The method of claim 24, further comprising retrieving at least some of the information from the storage device and using the retrieved information to provide a representation of the robot and the neighborhood, the representation comprising a graphical display on a user interface, the graphical display showing a path of motion of the part of the robot through the neighborhood.

31. The method of claim 30, wherein the path of motion is based on the geometrical feature.

32. A robot comprising:

a robot arm;

sensors to obtain data resulting from manual movement of the robot arm to points in a neighborhood of the robot in order to obtain the data from the sensors;

memory storing computer code; and a control system to execute the computer code to control movements of the robot arm within the neighborhood of the robot and to obtain information corresponding to a geometrical feature in the neighborhood based on the data from the sensors, the geometrical feature comprising a line, a plane, or a three-dimensional object;

the computer code also being executable by the control system to perform operations comprising: storing, in the memory, the information representing the geometrical feature and a label identifying the geometrical feature;

wherein the information representing the geometrical feature and the label are usable by the control system to control movements of a part of the robot along multiple different paths, and are usable to implement the movements.

33. The robot of claim 32, wherein the robot arm comprises an articulated robot arm comprising at least one of motors or joints; and wherein the data obtained from the sensors represents movement of the motors or joints.

34. The robot of claim 32, wherein the robot comprises one or more sections that can undergo translational displacement.

35. The robot of claim 32, wherein the information represents at least one composite comprised of multiple geometrical features, the composite-having an associated label stored in the memory.

36. The robot of claim 32, further comprising a user interface to generate a graphical display based on at least some of the information, the graphical display comprising a representation of the robot and the neighborhood, the graphical display showing a path of motion of the at least part of the robot through the neighborhood.

37. The robot of claim 36, wherein the path is modifiable based on a translation of coordinates contained in the information.

38. The robot of claim 32, wherein the computer code is executable to generate computer instructions to instruct the movement.

* * * * *